United States Patent [19]
Kusser et al.

[11] Patent Number: 6,068,231
[45] Date of Patent: *May 30, 2000

[54] DEVICE AND METHOD FOR SUPPORTING A DISK

[75] Inventors: Georg Kusser; Josef Kusser, both of Aicha v.W., Germany

[73] Assignee: Granit-und Schotterweke Josef Kusser, Aicha v.W., Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,190

[22] Filed: Oct. 28, 1997

[30] Foreign Application Priority Data

Oct. 30, 1996 [DE] Germany ............................ 196 43 919

[51] Int. Cl.⁷ ............................ A47G 29/00; F16C 32/06
[52] U.S. Cl. ...................................... 248/346.01; 384/118
[58] Field of Search .............................. 248/346.01, 671, 248/678, 676, 146, 346.11, 346.2; 384/116, 108, 118, 111

[56] References Cited

U.S. PATENT DOCUMENTS

| | | |
|---|---|---|
| 2,722,463 | 11/1955 | Shaw et al. .............................. 384/108 |
| 2,760,832 | 8/1956 | Bidwell .................................... 384/116 |
| 3,229,949 | 1/1966 | Chaconas ........................... 248/346.11 |
| 3,265,452 | 8/1966 | Pan et al. ................................. 384/109 |
| 3,782,791 | 1/1974 | Neumann et al. ...................... 384/116 |
| 3,927,921 | 12/1975 | Woolley .................................. 384/415 |
| 4,194,796 | 3/1980 | Svensson et al. ....................... 384/116 |
| 4,325,583 | 4/1982 | McHugh ................................. 384/117 |
| 4,647,227 | 3/1987 | Clebant ..................................... 384/99 |
| 5,518,319 | 5/1996 | Selby ...................................... 384/100 |

FOREIGN PATENT DOCUMENTS

| | | |
|---|---|---|
| 86 25 808 U | 11/1986 | Germany . |
| 38 02 561 C2 | 8/1989 | Germany . |
| 353942 | 6/1961 | Switzerland . |

Primary Examiner—Anita M. King
Attorney, Agent, or Firm—Armstrong, Westerman, Hattori, McLeland & Naughton

[57] ABSTRACT

The invention relates to a device for movably supporting or mounting a disk, a fluid supply being provided in a holding device so that the disk can be supported movably in the holding device on a fluid film and a return force acting on the object due to the configuration of the supported disk and a recess arranged in the holding device in conjunction with the fluid film when the object is deflected from its resting position, the invention also relating to a method for supporting the object.

22 Claims, 3 Drawing Sheets

DEVICE AND METHOD FOR SUPPORTING A DISK

BACKGROUND OF THE INVENTION

1. Field of the Invention

The invention relates to a device for supporting an object in a holding device, the holding device comprising a recess for receiving object, the holding device comprising a device for fluid supply in the region of the recess, and the object being supported movable in the holding device, wherein said object is roughly disk-shaped, the peripheral edge of said object is supported in said recess, and said edge is rounded at the portions adjoining the side surface areas of said object, as well as to a method for supporting this object.

2. Description of the Prior Art

It is known to support or mount spheres by means of a film of water, so that these usually very heavy spheres can be turned with relatively little exertion. Thus, e.g. in Carrara, Italy a so-called "floating sphere" has been on show since decades which is supported on such a film of water and can be rotated by relatively little exertion, for instance by hand. Such a sphere was also on show at the 1983 IGA Exhibition in Munich.

A device for mounting or supporting and for driving such a floating sphere is described e.g. in DE 38 02 561.

SUMMARY OF THE INVENTION

The object of the present invention is to propose a supporting arrangement, in which the object supported on a fluid film is intended to be rotatable and not featuring a spherical shape. In addition, the intention is to propose a method for supporting such an object.

This task is solved by a device for supporting an object in a holding device, the holding device comprising a recess for receiving the object, the holding device comprising a device for fluid supply in the region of the recess, and the object being supported movable in the holding device, wherein said object is roughly disk-shaped, the peripheral edge of said object is supported in said recess, and said edge is rounded at the portions adjoining the side surface areas of said object, as well as by a method of supporting or mounting a movable disk-shaped object in a holding device having a fluid supply and a recess, said object being mounted on a fluid film arranged between said recess and said object, and said recess and said object are shaped such that in conjunction with said fluid film and/or said fluid supply a return force is generated when said object is deflected from its resting position.

Expedient embodiments of the invention read from the sub-claims.

According to the invention, due to the rounding of the edge at the portions adjoining the side surface areas of the object the disk-shaped object is able to return to its resting position from a slight deflection. Were the object to have sharp edges, this would result in the object tilting from a slight deflection, thus making it impossible for it to return to its resting position.

In a preferred embodiment the fluid for supporting the disk is water, so that the disk is supported. i.e. "floats", on a thin film of water.

Preferably the disk comprises an approximately horizontal axis of rotation coinciding more or less with the axis of symmetry of the disk.

The gap formed by the disk and the recess in the holding device in which the disk is supported has a width which is in the range of approximately 0.1 to 2 mm, more particularly approximately 0.2 mm. The fluid present in this gap represents the film of fluid for supporting the disk.

In a preferred embodiment roughly 10 to 50% of the diameter of the disk is arranged in the recess of the holding device, i.e. approximately 50 to 90% of the diameter of the disk is not in the recess of the holding device. It is especially preferred that roughly 20% of the disk height is supported in the recess.

It is of advantage to provide the fluid supply centrally in the recess since this promotes uniform outflow of the fluid on both sides of the object.

Advantageously at least two devices for fluid supply are provided so that the fluid film for supporting the disk is fed to advantage by two separate supplies.

Preferably the at least two fluid supplies are arranged juxtaposed in a direction perpendicular to the axis of rotation of the disk. This then enables the generation of a torque of the disk e.g. via one or more fluid nozzles disposed slanted. The fluid supplies may also comprise valves so that fluid is able to flow only in the direction of the disk.

Advantageously the at least two fluid supplies comprise independent pumps, the supplies being arranged so that when the disk is slanted one port of the two supplies is closed more than the other, as a result of which less water is able to pass through this port. This results in an elevated pressure being generated at the port which is more closed due to the pump arranged under this port, this elevated pressure acting on the disk so that the slightly slanted disk is returned to its resting position by the force generated by the pump, both supplies then again having the same opening and an equilibrium of forces exists. Due to the openings of the supply ports being covered unequally the slant of the disk thus results in the pump supplying the fluid through the more covered port exerting a greater force on the disk than the pump supplying the fluid through the port not covered as much or not at all so that the pump supplying fluid through the more covered port exerts a force on the disk which causes the slightly slanted disk to be urged back into its resting position.

It is possible to arrange the fluid supply so that a torque is generated in the disk.

Preferably the radii of the rounded edges of the disk are in the range of 5 to 50%, preferably 10 to 35% of the width of the disk.

The surface areas of the disk may be configured flat or plane.

In another embodiment of the invention the rotatively supported disk may be configured also slightly conical at the side surface areas, i.e. the disk featuring maximum thickness at its axis of symmetry or rotation, this thickness gradually diminishing towards the edge.

Preferably together with the device for supplying the fluid a reservoir is also configured below the rotatable disk so that the water flow is uniformly distributed in the recess.

In the method in accordance with the invention for supporting the rotatable disk-shaped object in the holding device the movably supported object is arranged on a fluid film provided between the object and a recess provided in the holding device. In this arrangement the recess and the movably supported object are configured so that due to the special shape of the object or recess in conjunction with the fluid film and/or the fluid supply a return force is generated when the movably supported object is deflected from its resting position.

Preferably the fluid film features a certain flow which affects the movably supported item i.e. the rotatable disk, so that it rotates without a force needing to be applied additionally from outside.

BRIEF DESCRIPTION OF THE DRAWINGS

The invention will now be described in detail on the basis of a preferred embodiment with respect to the drawings in which.

DESCRIPTION OF THE PREFERRED EMBODIMENTS

Figure 1:
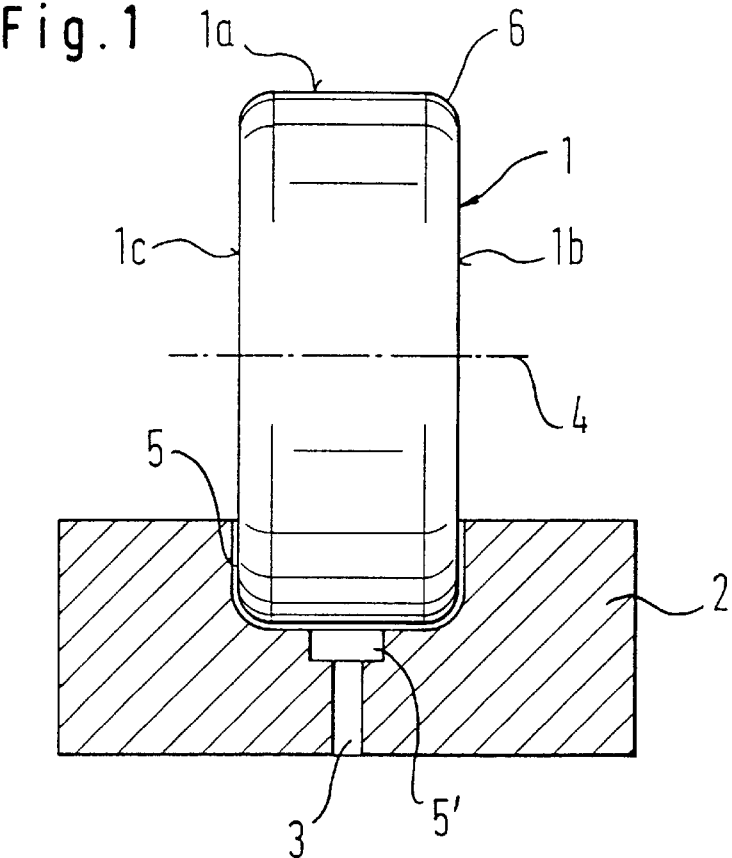
FIG. 1 is a section in vertical direction through the supporting arrangement in accordance with the invention.

As evident from FIG. 1 a disk 1 is supported in a holding device 2. The disk is arranged so that its axis of rotation or symmetry 4 is located approximately horizontal. The disk has a left-hand side surface area 1c and a right-hand side surface area 1b which in the example embodiment shown are configured flat. The peripheral surface area 1a of the disk 1 is configured so that the transition from the peripheral surface area 1a to the side surface areas 1b or 1c comprises a curvature 6.

The holding device 2 comprises a recess 5 corresponding in shape more or less to that of the disk 1 peripherally, so that a gap can be configured between the recess 5 and the disk 1, this gap having more or less the same thickness all over in the resting position of the disk 1 in the absence of a water flow.

Arranged in the holding device 2 are several means for a water supply 3 in the peripheral direction of the disk 1, only one of which is shown in FIG. 1 so that by a suitable arrangement of the water supply a torque can be generated in the disk 1. In the upper portion of the water supply 3 a reservoir 5' is formed juxtaposing the recess 5.

The reservoir 5' is preferably configured elongated so that the water supply is uniformly distributed in the recess 5.

Figure 2:
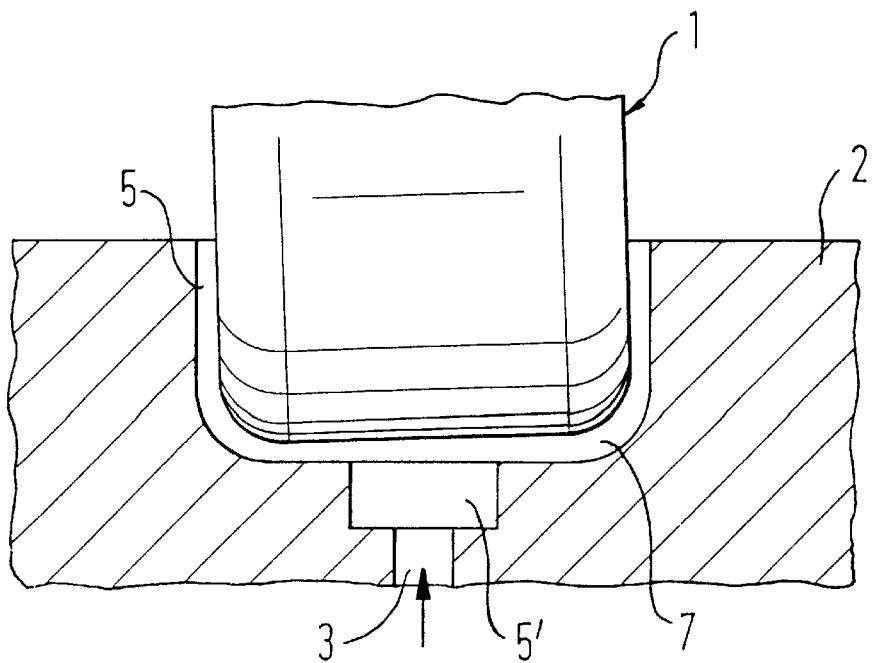
FIG. 2 is a magnified view of the supporting arrangement of the device as shown in FIG. 1, with the disk slightly slanted.

Illustrated in FIG. 2 is again the lower section of the support in accordance with the invention, with the disk 1 slightly slanted. Such a slant resulting, for instance, due to external effects is automatically cancelled in the configuration in accordance with the invention, i.e. the disk returning to its vertical position when subject to a flow from underneath.

Figure 3:
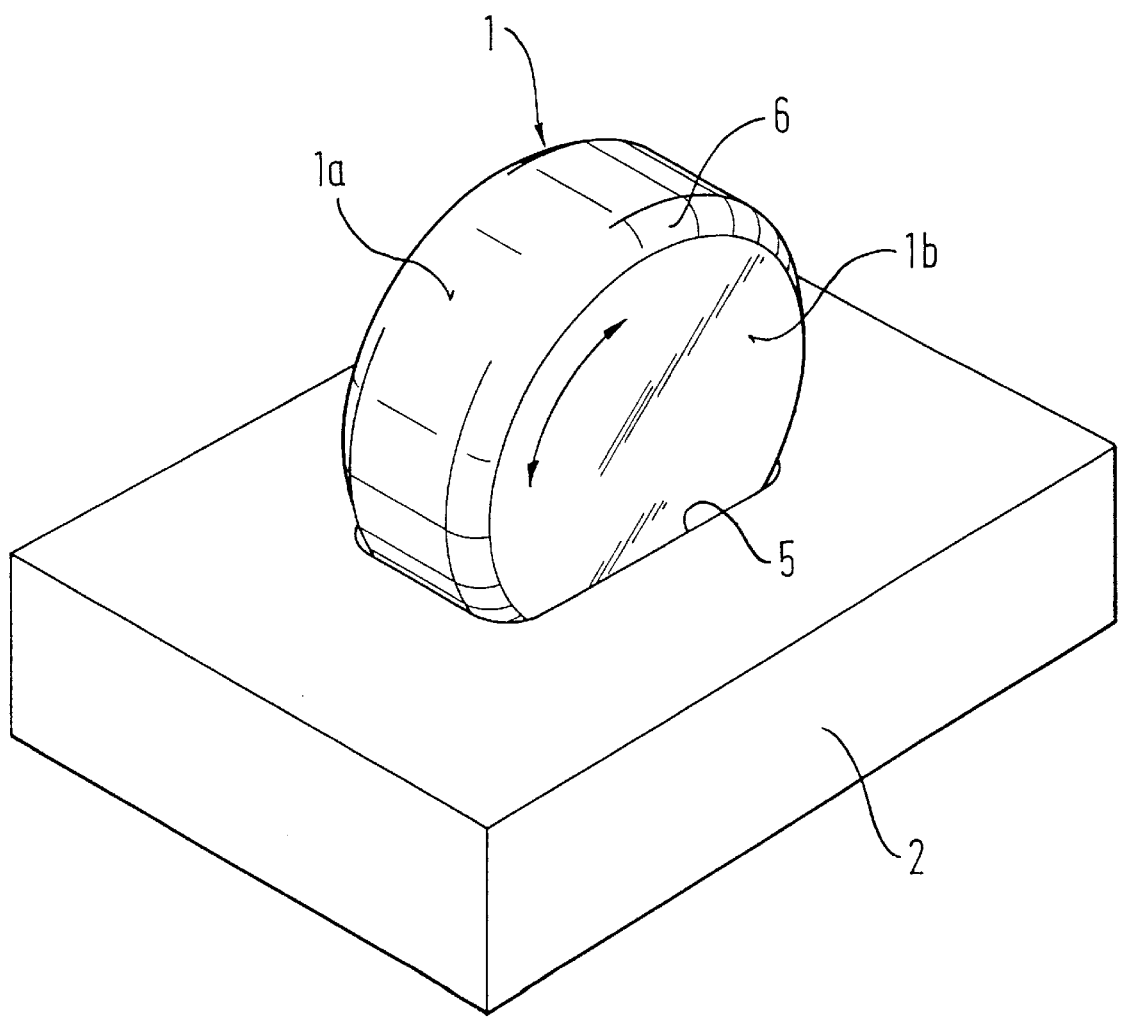
FIG. 3 is a perspective side view of the device in accordance with the invention.

FIG. 3 shows the disk 1 which is able to move within the recess 5 of the holding device 2 in the directions as indicated by the arrow.

Figure 4:
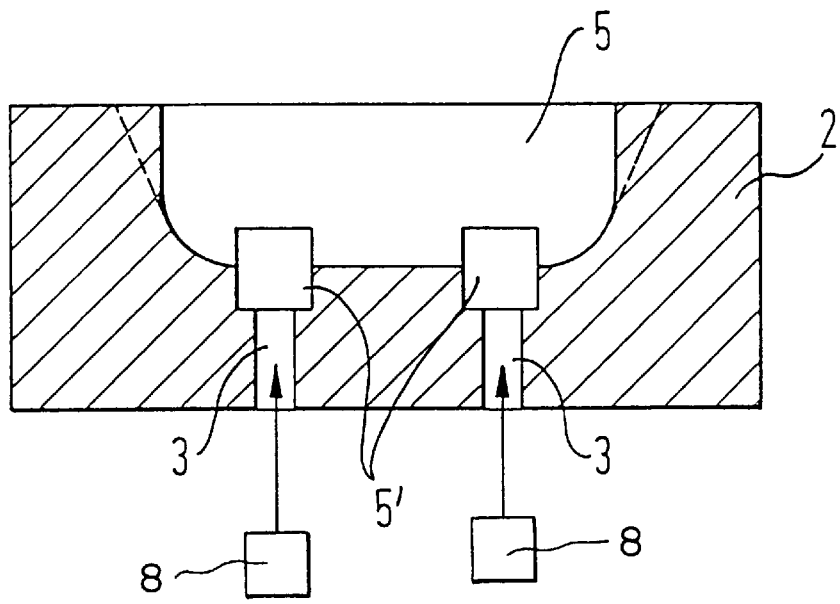
FIG. 4 is a section in vertical direction through the supporting arrangement in accordance with the invention with two separate supplies.

FIG. 4 shows a further embodiment of the invention without a disk 1 located in the holding device 2. In this arrangement the water supply 3 in the holding device 2 connected to two independent pumps 8 is configured so that two separate water supplies are provided which supply water via the respective reservoir 5'. The recess 5 may be configured as shown. However, as indicated by the broken lines it may also represent a port opening upwards so that the portion of the recess 5 is located with the smallest cross-section directly above the water supply 3. When a disk 1 is located in the recess 5 the disk 1 is subjected to the same forces due to the two supplies via the two separate pumps arranged under the supplies when in a perpendicular position, causing it to remain perpendicular.

When, however, the disk 1 is deflected from its resting position, causing it to be slightly slanted, one port of a water supply 3 is more covered so that not as much water is able to flow through this covered port as through the other non-covered port. This results in the pump located under this port producing a higher pressure since the water flow through this pump is obstructed. Due to this higher pressure a force is exerted via the water on the slightly slanted disk 1 which counteracts the deflection of the disk 1 so that the disk 1 is returned to its resting position.

Figure 5:
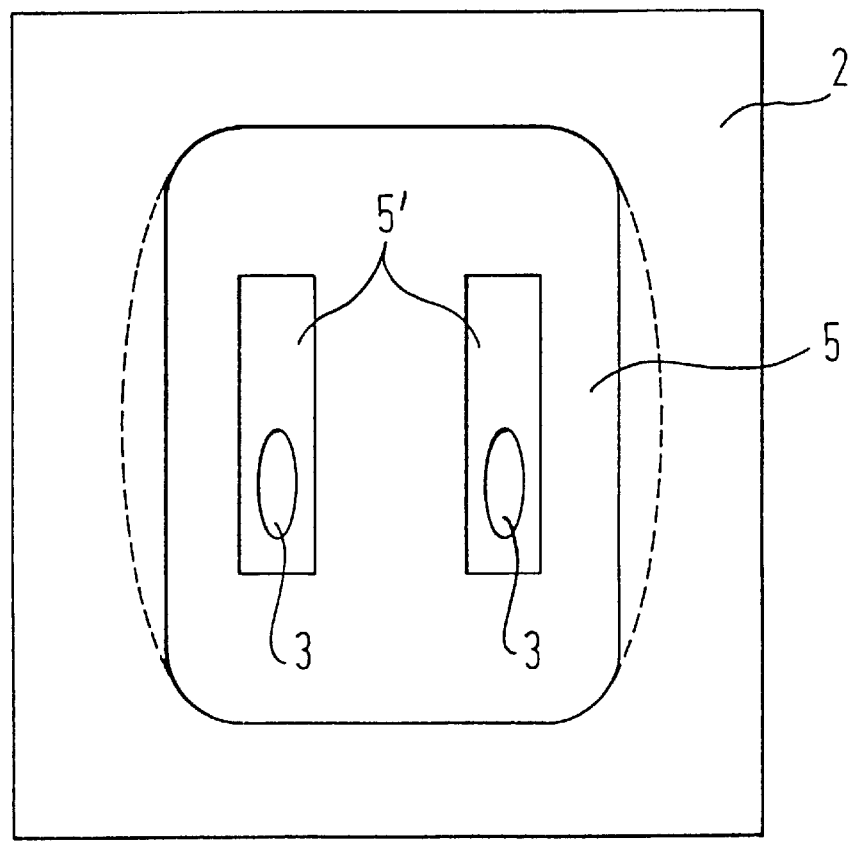
FIG. 5 is a plan view of the arrangement as shown in FIG. 4.

As evident from FIG. 5 the water supply 3 must not be arranged centrally in the reservoir 5'. The water supply 3 may have a slightly oval port extending along the direction of rotation of the disk. The broken lines indicate, the same as in FIG. 4, that the recess 5 may comprise a port with an upwardly increasing opening.

We claim:

1. A supporting or mounting arrangement comprising:

a holding device having:

a cup-shaped recess; and a fluid supply device in the region of the recess; and an object being roughly disk-shaped and having a rounded peripheral edge adjoining side surface areas, said peripheral edge being movably supported in said cup-shaped recess of said holding device, wherein said fluid supply device extends along a length of said recess to supply a fluid underneath said object to suspend said object above the recess and to rotate said object in a direction along the length of said recess about a rotational axis of said object perpendicular to the length of said recess.

2. The supporting arrangement as set forth in claim 1, wherein the fluid supplied through said fluid supply is water.

3. The supporting arrangement as set forth in claim 1, wherein said rotational axis of said object is roughly coincident with the axis of symmetry of said object.

4. The supporting arrangement as set forth in claim 1, wherein said object is suspended above said recess by a gap in which the fluid is present.

5. The supporting arrangement as set forth in claim 4, wherein a width of said gap is 0.1 to 2 mm.

6. The supporting arrangement as set forth in claim 4, wherein a width of said gap is 0.2 mm.

7. The supporting arrangement as set forth in claim 1, wherein 10 to 50% of a diameter of said object is arranged in said recess of said holding device.

8. The supporting arrangement as set forth in claim 1, wherein said fluid supply device is provided centrally in said recess.

9. The supporting arrangement as set forth in claim 1, wherein said fluid supply device comprises at least two supplies.

10. The supporting arrangement as set forth in claim 9, wherein said two supplies are arranged in parallel extension next to each other along the length of said recess.

11. The supporting arrangement as set forth in claim 1, wherein said fluid supply device is slanted relative to the length of said recess to generate a torque in said object.

12. The supporting arrangement as set forth in claim 9, wherein said fluid supply device comprises at least two pumps, namely a pump for each of said at least two supplies.

13. The supporting arrangement as set forth in claim 1, wherein said object has a radii of curvature between said peripheral edge and said side surface areas are in a range of 5 to 50% of a width of said object.

14. The supporting arrangement as set forth in claim 1, wherein said object has a radii of curvature between said peripheral edge and said side surface areas are in a range of 10 to 35% of a width of said object.

15. The supporting arrangement as set forth in claim 14, wherein said side surface areas of said object are flat.

16. The supporting arrangement as set forth in claim 14, wherein said side surface areas of said object comprise, in a region of said axis of symmetry of said object, a maximum thickness which gradually diminishes in a direction of said peripheral edge.

17. The supporting arrangement as set forth in claim 1, wherein a reservoir is arranged above said fluid supply device in said holding device.

18. A method of supporting or mounting a moveable disk-shaped object in a holding device having a fluid supply device and a cup-shaped recess, said method comprising the steps of:

mounting said object on a fluid film arranged between said recess and said object; and generating a return force when an edge of a flat side surface of said disk-shaped object is deflected in a direction substantially perpendicular to a length of the recess.

19. The method as set forth in claim 18, further comprising generating a torque in said object by a flow of the fluid film in a direction slanted from the length of the recess.

20. A holding device for a roughly disk-shaped object with rounded edges, said holding device comprising:

a cup-shaped recess for support of a portion of the object; and a fluid supply device having two supplies, each of the two supplies having a length, the lengths of the two supplies extending in parallel next to each other along a length of said recess, supplying a fluid from underneath the object for suspension of the object above said recess for movement along the length of said recess.

21. The holding device as set forth in claim 20, wherein the fluid provided by one of said two supplies provides a return force against a deflection of the object in a direction substantially perpendicular to the direction of movement of the object.

22. The holding device as set forth in claim 20, wherein said two supplies are arranged off-center in said recess.

* * * * *